(12) United States Patent
Rains

(10) Patent No.: US 6,419,326 B1
(45) Date of Patent: Jul. 16, 2002

(54) LOCKING LUG COVER

(76) Inventor: Douglas A. Rains, 1008 Brentwood Dr., Ponca City, OK (US) 74601

( * ) Notice: Subject to any disclaimer, the term of this patent is extended or adjusted under 35 U.S.C. 154(b) by 0 days.

(21) Appl. No.: 09/692,942

(22) Filed: Oct. 20, 2000

(51) Int. Cl.[7] .............................................. B60B 17/16
(52) U.S. Cl. .............................. 301/37.21; 301/37.372; 70/225; 70/259
(58) Field of Search ......................... 301/37.21, 37.371, 301/37.372, 37.376; 70/225, 259

(56) References Cited

U.S. PATENT DOCUMENTS

| | | | | |
|---|---|---|---|---|
| 2,124,035 A | * | 7/1938 | Hurd | 70/259 |
| 2,305,111 A | * | 12/1942 | Schueren et al. | 301/37.21 |
| 2,568,370 A | * | 9/1951 | Scuderi | 70/225 |
| 2,722,822 A | | 11/1955 | Thomas | |
| 2,874,561 A | | 2/1959 | Alger | |
| 2,896,440 A | | 7/1959 | Romsteadt, Jr. | |
| 3,170,733 A | | 2/1965 | Lamme | |
| 3,833,266 A | | 9/1974 | Lamme | |
| 3,965,708 A | | 6/1976 | Smiley | |
| 4,161,869 A | | 7/1979 | Dixon | |
| 4,217,002 A | | 8/1980 | Simpson | |
| 4,346,940 A | | 8/1982 | Tartar | |
| 4,478,458 A | | 10/1984 | Flexman | |
| 4,723,818 A | | 2/1988 | Beisch | |
| 4,825,669 A | * | 5/1989 | Herrera | 70/163 |
| 5,853,228 A | * | 12/1998 | Patti et al. | 301/37.372 |

* cited by examiner

Primary Examiner—Russell D. Stormer

(57) ABSTRACT

A Locking Lug Cover assembly is disclosed which utilizes an annulus secured by a locking mechanism to the specialy designed lug nuts or studs of a vehicle wheel for prohibiting access to the aforementioned lug nuts or studs of a vehicle, The annulus is constructed of a rigid, machineable material substantial in construction as to not allow deflection or breakage by applied force. The annulus is connected to the vehicle hub with mounting attachments that connect to the specially designed extended lug nuts or studs of a vehicle. A locking mechanism such as a cam lock extends through the cross section of the annulus to communicate with the lug nuts or bolts and hold the lug cover securely in place.

7 Claims, 5 Drawing Sheets

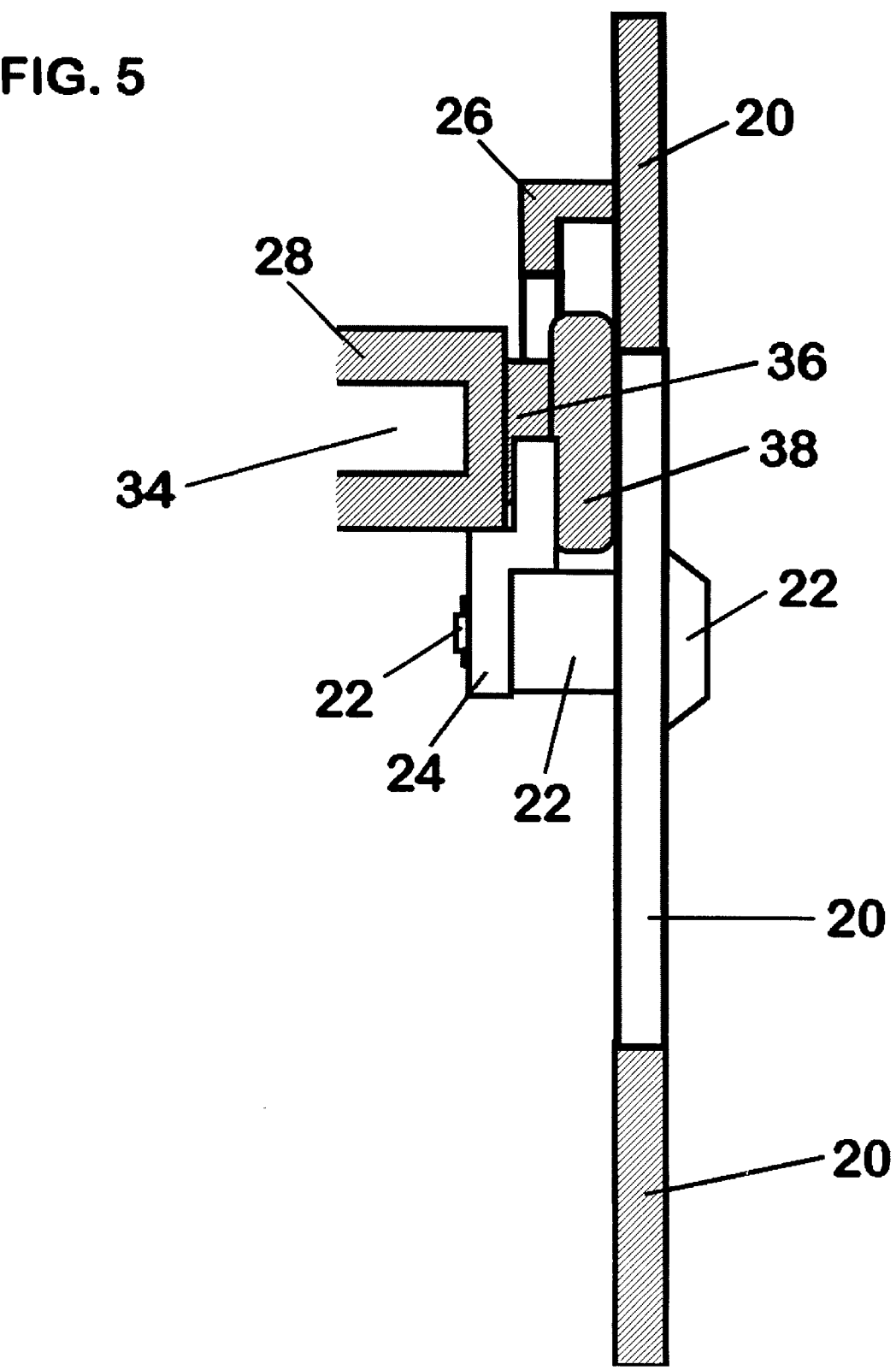

LOCKING LUG COVER

BACKGROUND

1. Field of the Invention

This invention relates to a locking mechanism for a vehicle wheel, specifically to a cost-effective anti-theft device for a vehicle wheel that covers its lugs.

2. Description of the Prior Art

Vehicle wheel designs have evolved to the point of being a mark of distinction for many vehicle owners. With the demand for fancy types of vehicle wheels and the interchangability of these wheels among various vehicles, theft is a major problem. There have been many features incorporated into hubcaps, lug guards and wheels themselves to prevent wheel theft. Many of these items will work with some degree of effectiveness; however, these devices are typically awkward in appearance, expensive to produce or complicated to operate.

U.S. Pat. No. 2,722,822 has a wheel cover that covers all the lug nuts. It is fastened to a threaded stud that extends outward from a center bracket. A locking device screws on the stud to hold the wheel cover in place.

U.S. Pat No. 2,874,561 has a wire placed under two lug nuts with a tang fixed to the wheel cover to secure the cover. The cover uses a locking keyed system to prevent removal.

U.S. Pat. No. 2,896,440 has three lug nuts with a bolt head protruding therefrom. A keyed locking system turns a three-prong clip that fits under the bolt heads and holds the cover in place.

U.S. Pat. No. 3,170,733 has a member fastened under the lug nuts. This member contains internal threads in the center that accepts external threads attached to a locking device. The locking device is attached to a wheel cover.

U.S. Pat. No. 3,833,266 has a member fastened under the lug nuts, which accepts a locking device. The locking device is attached to a wheel cover.

U.S. Pat. No. 3,965,708 has a member fastened to a wheel cover that uses a locking device to remain in place.

U.S. Pat. No. 4,161,869 has a locking mechanism that extends through a device that covers the lug nuts. The tumbler housing is inserted into a cylinder mounted on the lug bolt.

U.S. Pat. No. 4,217,002 has a member fastened onto the wheel that is fastened to a wheel cover through the center.

U.S. Pat. No. 4,346,940 has a member fastened under the lug nuts. A threaded bolt is secured through the support member and locked to the outer part of the rim.

U.S. Pat. No. 4,478,458 has a system for attaching wire wheels that does not disclose a locking method.

U.S. Pat. No. 4,723,818 has an annular device attached to a hub by a bolt in the center. The hub member is attached to the wheel.

U.S. Pat. No. 4,825,669 has a universal hub cover with a support member fastened under the lug nuts. A lug cover is fastened using a locking mechanism.

U.K. Pat. No. 2,046,165 has a hub cover that uses detents in a locking plug that are adjusted for assorted hub configurations.

German Pat. No. 28 28 104 has a wheel hub designed for the lug cover which contains tangs controlled by the key lock.

All the previous work attempts to provide vehicle wheel and wheel accessory theft protection, but the disadvantages must be examined.

(a) Much of the prior art specifically regards wheel covers, otherwise known as hubcaps. While they do cover the lug bolts of a vehicle wheel, they fail to address theft protection for the wheel itself in lacking substantial materials of construction.

(b) On the devices designed to restrict access to the lug nuts, most are designed for a specific lug bolt spacing, although U.S. Pat. No. 4,825,669 provides a universal mounting assembly.

(c) All the prior art devices are complex and expensive to manufacture relative to the vehicle wheel.

(d) Several of the aforementioned devices use brackets mounted between the wheel and the rotor of the vehicle that could compromise the integrity of the wheel attachment to the vehicle.

(e) The prior art fails to take into consideration the presence of the wheel hub extension, which on some vehicles, such as four-wheel drive vehicles, is quite large in projection. These devices use fastening means mounted in the center of the wheel hub area.

SUMMARY

In accordance with the present invention, the locking lug cover comprises an annulus equipped with attaching means mated to a plurality of extending lug nuts and is locked in place on a vehicle to obstruct access to the lug nuts of the vehicle.

Objects and Advantages

Several objects and advantages of the present invention are:

(a) To provide a theft protection device for vehicle wheels of substantial construction as to prohibit removal of the wheel by force.

(b) To provide a theft protection device for vehicle wheels that will fit a wide range of vehicle bolt patterns.

(c) To provide a theft protection device for vehicle wheels that is simple and inexpensive to manufacture relative to the vehicle wheel.

(d) To provide a theft protection device for vehicle wheels that will not affect the integrity of the wheel mounting to the vehicle.

(e) To provide a theft protection device for vehicle wheels that will not interfere with the central hub area of the vehicle.

Further objects and advantages are to provide a theft protection device that enhances the aesthetic appeal of the vehicle wheel. Still further objects and advantages will become apparent from a consideration of the ensuing description and drawings.

DRAWING FIGURES

FIG. 1. shows a frontal view of the locking lug cover including the face of the locking mechanism.

FIG. 5 is a cross section of the locking lug cover and the extended lug nut including mechanism taken along line 5—5 of FIG. 1.

Figure 1:
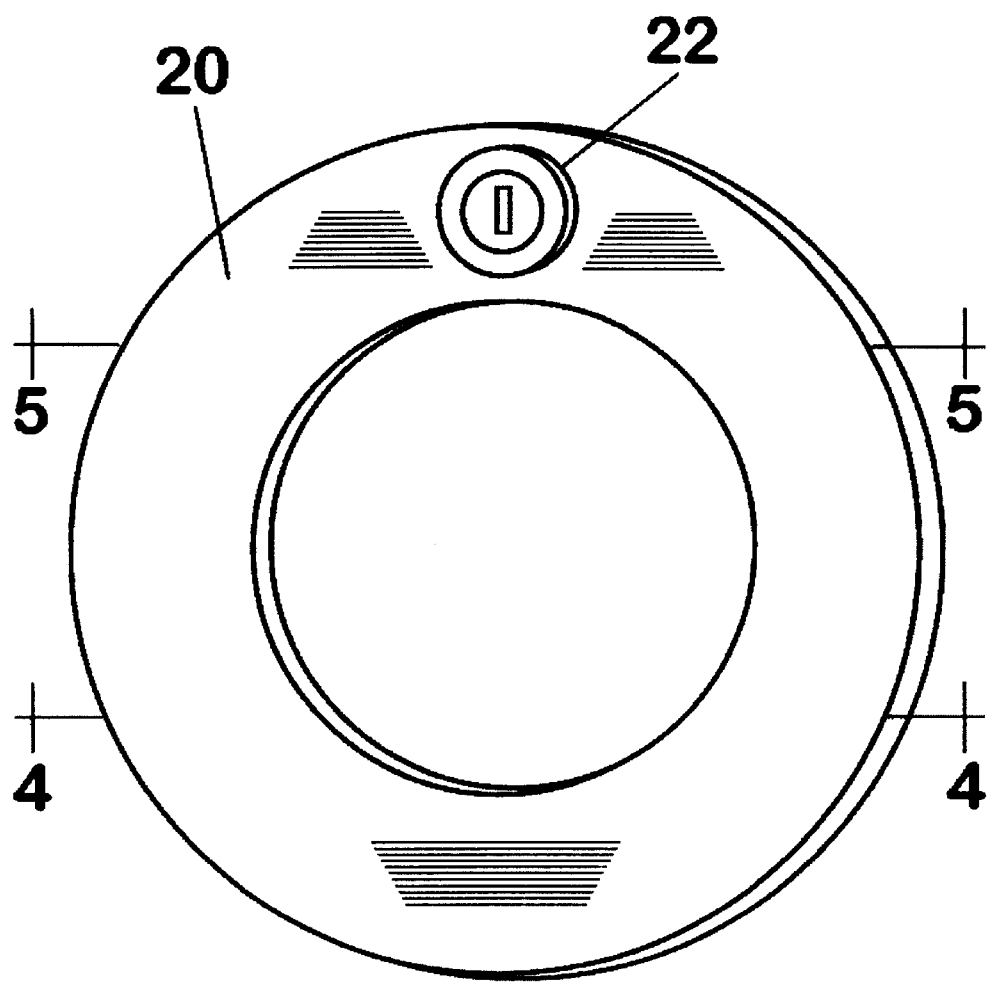

REFERENCE NUMERALS IN DRAWINGS 14 vehicle lug bolt
16 vehicle wheel
18 styling accessory
20 annulus
22 locking mechanism
24 lock cam
26 mounting attachment
28 extended lugnut body
30 seating surface
32 threaded area
34 hollow area
36 circumferential groove
38 circular nub

DESCRIPTION

Preferred Embodiment

A preferred embodiment of the present invention is illustrated in the FIGS. 1–5. FIG. 1 is the frontal view. The annulus 20 is constructed from a rigid ineable material, typically steel, although other materials may be substituted. The annulus 20 must be constructed with width as to cover the lug attachments (not shown) of the vehicle and with a thickness as to not significantly deflect, bend or break under force. The face of the annulus 20 may be finished is a variety of ways to provide styling effects. Some examples of this may include varying the smoothness of the edges, widening or narrowing the annulus 20, incorporating curvature, or even an alternate shape altogether.

A locking mechanism 22 is mounted through a cross section of the annulus 20. The locking mechanism 22 is illustrated as a keyed cam lock, but an alternate locking mechanism may be used to perform the desired function.

Figure 2:
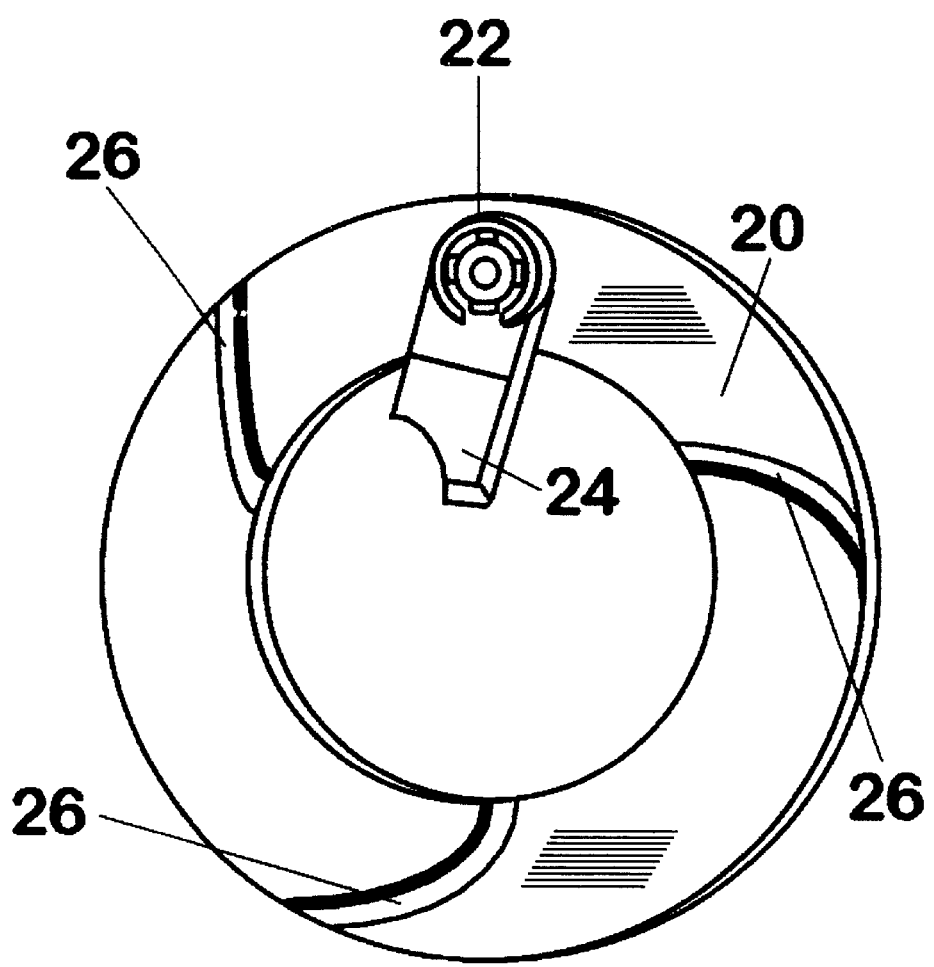
FIG. 2 shows a rearward view of the locking lug cover including the mounting and the underneath of the locking mechanism.

Turning now to FIG. 2, the rearward view, the mounting attachment 26 shown is a curved angle extending from beneath the annulus 20. Shown are three mounting attachments 26 corresponding to a five-lug application, but the number of mounting attachments 26 may be up to the number of lug bolts 14 on the vehicle; however, the number of mounting attachments 26 must be greater than fifty-percent of the vehicle lug attachments. Alternate configurations of mounting attachments 14 are necessary for vehicles with lug bolts numbering four, six, eight or any others. The mounting attachments 26 are held beneath the annulus 20 securely.

The locking mechanism 22 extends through the annulus 20. It is held in position on the vehicle by a closely fitted lock cam 24. The illustrated lock cam 24 is rectangular, with a circular notch removed from one corner. This corner fits tightly against the extended lug nut of FIG. 3 when the locking mechanism 22 is actuated. The shape of the lock cam 24 is one embodiment for illustrative purposes; however, there are many alternate configurations of the lock cam 24.

Figure 3:
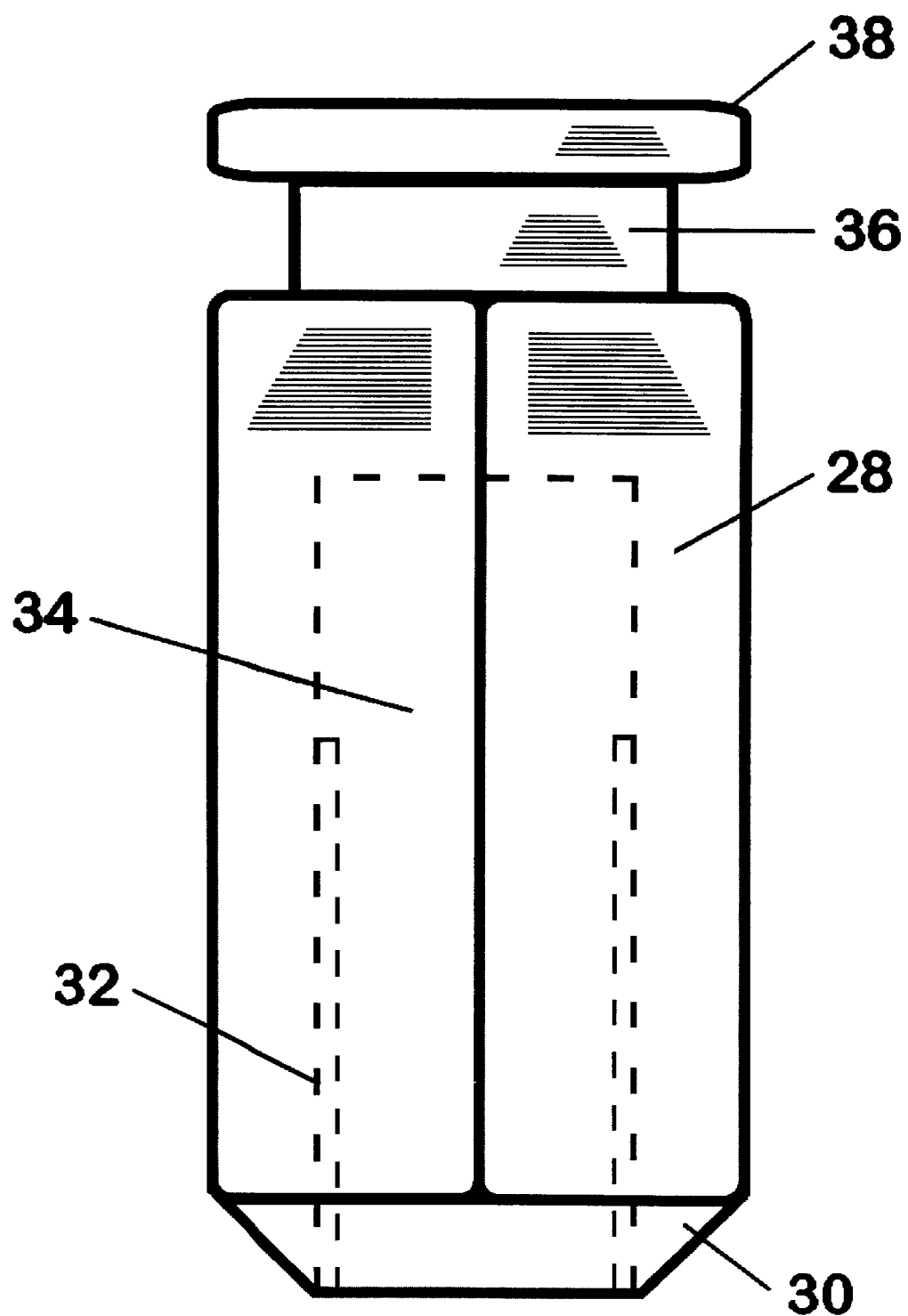
FIG. 3 shows a side view of the extended lug nut used to mount the locking lug vehicle.

FIG. 3 shows an overview of the extended lug nut of FIG. 3 used to attach the locking lug cover assembly shown in FIG. 1 and FIG. 2 to a desired vehicle. The extended lug nut of FIG. 3 is shaped like a typical enclosed hex lug nut for a vehicle, extended in length to position the locking lug cover assembly shown in FIG. 1 and FIG. 2 a desired distance from the surface of the vehicle wheel (not shown). One end of the extended lug nut is internally threaded 32 to fasten to the lug bolt (not shown) of the desired vehicle. Above the threaded area 32 is an enclosed hollow area 34 into which the lug bolt of the vehicle will extend. The lug bolt will not reach the top. The length of the enclosed end is long enough to provide adequate rigidity and break resistance. On the exterior tip of the enclosed end is a circumferential groove 36 and circular nub 38 to provide the attaching means for the locking lug cover assembly shown in FIG. 1 and FIG. 2. The mounting attachment 26 will fit securely in the circumferential groove 36 and be held in place by actuating the locking mechanism 22 and lock cam 24.

Figure 4:
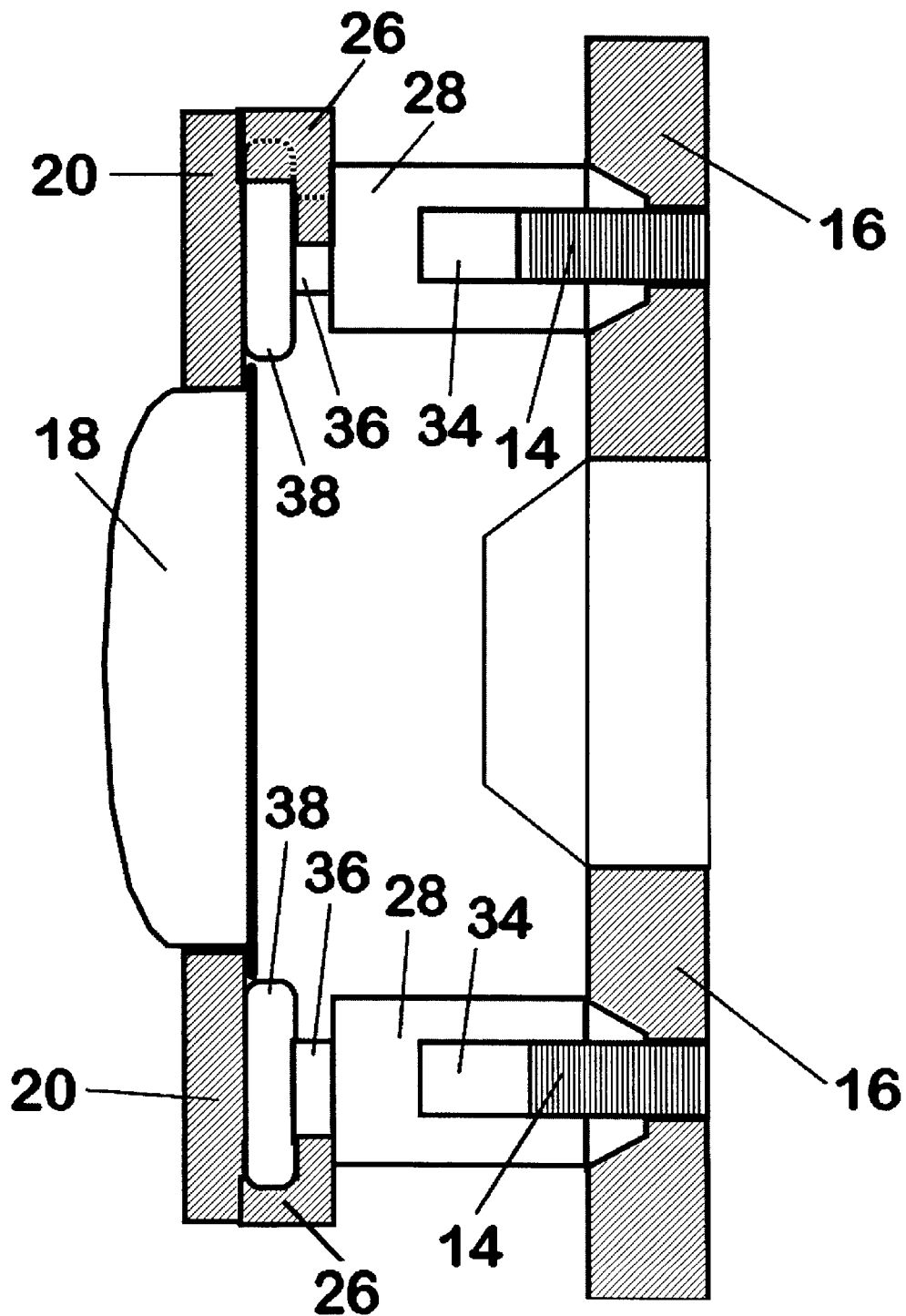
FIG. 4 is a cross section of the locking lug cover, the extended lug nut and the on of the vehicle wheel taken along line 4—4 of FIG. 1.

FIG. 4 is a cross-section of the locking lug cover assembly shown in FIG. 1 and FIG. 2 including the center section of the vehicle wheel 16 taken along line 4—4 of FIG. 1. It is held in place securely by the mounting attachment 26 mated to the circumferential groove 36 and circular nub 38 of the extended lug nut 28 shown in FIG. 3. The extended lug nuts 28 shown in FIG. 3 are attached to the lug bolt 14 of the vehicle. An optional decorative accessory 18 is shown in the center of the annulus 20.

FIG. 5 is a cross section of the locking lug cover assembly shown in FIG. 1 and FIG. 2, the extended lug nut shown 28 in FIG. 3 and the locking mechanism 22 taken along line 5—5 of FIG. 1. The locking lug cover assembly shown in FIG. 1 and FIG. 2 is held securely in place by the mounting attachment 26 mated to the circumferential groove 36 and the circular nub 38 of the extended lug nut of FIG. 3. The depth of extension of the locking mechanism 22 is illustrated in this figure along with the fit of the lock cam 24 in to the circumferential groove 36 and the circular nub 38. An optional decorative accessory 18 is shown in the center of the annulus 20.

OPERATION

To begin operation of the present invention, establish the number of vehicle lug bolts 14 for the given vehicle. Select the locking lug cover assembly shown in FIG. 1 and FIG. 2 and number of extended lug nuts of FIG. 3 for the vehicle based on the number of vehicle lug bolts 14. Install the lock cam 24 that is the correct size for the vehicle application.

Remove the standard lug nuts (not shown) from the vehicle and install the extended lug nuts of FIG. 3. Place the locking lug cover assembly shown in FIG. 1 and FIG. 2 with the mounting attachments 26 on the extended lug nuts of FIG. 3. Rotate the locking lug cover assembly shown in FIG. 1 and FIG. 2 until firmly positioned. Actuate the locking mechanism 22 to hold the locking lug cover assembly shown in FIG. 1 and FIG. 2 in place.

Conclusion, Ramifications, and Scope

Accordingly, the reader will see that the locking lug cover will provide a theft protection device for vehicle wheels of substantial construction as to prohibit removal of the wheel from the vehicle by impeding access to the lug nuts of the vehicle. The locking lug cover is an economical application that is simply designed and constructed relative to the expense of the vehicle wheel. Furthermore, each configuration will fit a wide range of vehicles.

From a safety standpoint, the locking lug cover will not affect the integrity of the wheel mounting to the vehicle nor interfere with the central hub area of the vehicle. The locking lug cover will provide security benefits while enhancing the aesthetic appeal of the vehicle wheel.

It is understood that all terms used herein are descriptive rather than limiting. While the invention has been described in conjunction with specific embodiments, it is evident that many alternatives, modifications, and variations will be apparent to those skilled in the art in light of the disclosure herein. For example alternative shapes may be used for the annulus 20, alternative locking methods may be employed or alternative mounting attachment design may be used in both the locking lug cover assembly shown in FIG. 1 and FIG. 2 and the extended lug nut of FIG. 3. Accordingly, it is intended to include all such alternatives, modifications and variations that fall within the spirit and scope of the appended claims.

I claim:

1. A locking lug cover assembly for a vehicle wheel attached to a vehicle through a plurality of lug bolts, said cover assembly comprising:

a cover member having a front side and a rear side with at least one lug attachment member rigidly secured to the rear side;

a locking mechanism pivotally attached to the rear side of said cover member and movable from a first locking position to a second unlocked position;

a plurality of lug nuts attachable to said lug bolts to secure the wheel to the vehicle, said lug nuts composing an extension;

whereby said cover member may be attached to the wheel with said attachment member engaging the extension on one of said lug nuts, and said locking mechanism engaging the extension on another of said lug nuts to lock the cover member to the wheel.

2. The locking cover assembly as set forth in claim 1 above, further comprising:

said first position of said locking mechanism engaging said lug nut extension to prevent removal of the cover member for the wheel, and said second position not engaging said lug nut extension so that cover member may be removed from the wheel.

3. The locking cover assembly as set forth in claim 1 above, wherein:

said lug nut extension composing a nub portion and a groove portion, said groove position having a small diameter than the nub portion; whereby said locking mechanism and said attachment member can engage said extension in the groove to retain said cover member on the wheel.

4. The locking cover assembly as set forth in claim 1, further comprising:

said cover member comprising an annular body.

5. The locking cover assembly as set forth in claim 1 further comprising:

said cover member comprising an annular body having an outer periphery and a central opening.

6. The locking cover assembly as set forth in claim 5, further comprising:

a hubcap having a portion sized to extend through said opening in said annular body to cover the center portion of the wheel.

7. The locking cover assembly as set forth in claim 1, further comprising:

at least two attachment members rigidly secured to the rear side of said cover member.

* * * * *